(12) United States Patent
Cheong et al.

(10) Patent No.: US 12,026,932 B2
(45) Date of Patent: Jul. 2, 2024

(54) METHOD TO DETERMINE AUTHENTICITY OF SECURITY HOLOGRAM

(71) Applicant: INNOV8TIF SOLUTIONS SDN. BHD., Subang Jaya (MY)

(72) Inventors: Yuen Kiat Cheong, Kampar (MY); Ken Wei Lim, Shah Alam (MY); Calvin Yap, Tampin (MY); Chin Seong Lee, Subang Jaya (MY); Seow Joe Seah, Kuala Lumpur (MY); Aaron Patrick Nathaniel, Subang Jaya (MY); Tien Soon Law, Puchong (MY); Peng Nam Soh, Shah Alam (MY); Wei Yan Lau, Langkawi (MY)

(73) Assignee: INNOV8TIF SOLUTIONS SDN. BHD., Subang Jaya (MY)

( * ) Notice: Subject to any disclaimer, the term of this patent is extended or adjusted under 35 U.S.C. 154(b) by 423 days.

(21) Appl. No.: 17/478,216

(22) Filed: Sep. 17, 2021

(65) Prior Publication Data

US 2023/0017185 A1  Jan. 19, 2023

(30) Foreign Application Priority Data

Jul. 15, 2021 (MY) .............................. PI2021004026

(51) Int. Cl.
*G06V 10/60* (2022.01)
*B42D 25/328* (2014.01)
(Continued)

(52) U.S. Cl.
CPC ........... *G06V 10/60* (2022.01); *B42D 25/328* (2014.10); *G03H 1/0011* (2013.01); *G06F 21/31* (2013.01); *G06T 7/11* (2017.01)

(58) Field of Classification Search
CPC ...... G06V 10/60; G06V 30/40; B42D 25/328; G03H 1/0011; G03H 2001/2247;
(Continued)

(56) References Cited

U.S. PATENT DOCUMENTS 8,059,858 B2 * 11/2011 Brundage ............... G07F 7/086
   382/116
9,584,729 B2 *  2/2017 Amtrup .................. H04N 23/64
(Continued)

FOREIGN PATENT DOCUMENTS

EP       3082292 A1    10/2016

*Primary Examiner* — Kathleen Y Dulaney
(74) *Attorney, Agent, or Firm* — JCIP; Joseph G. Chu; Jeremy I. Maynard

(57) ABSTRACT

The invention relates to a method to determine authenticity of a security feature of an identification document, comprising: receiving a real-time video feed of the identification document with a light source directed at the identification document to make visible a security hologram; processing the real-time video feed into a plurality of image sequence; analysing each image from the plurality of image sequence for a glare and the security hologram, wherein the glare is a reflection of the light source from the identification document; analysing the position of the glare and the security hologram in each image; evaluating whether the position of the glare and the position of the security hologram is caused by the light source; providing authenticity result of the identification document captured from the real-time video feed, and using an algorithm to generate a random designated region for the light source to be positioned to.

5 Claims, 4 Drawing Sheets

(51) Int. Cl.
*G03H 1/00* (2006.01)
*G06F 21/31* (2013.01)
*G06T 7/11* (2017.01)

(58) Field of Classification Search
CPC ........... G03H 1/22; G06F 21/31; G06F 21/34; G06T 7/11
USPC .................................................. 382/103, 112
See application file for complete search history.

(56) References Cited

U.S. PATENT DOCUMENTS

| | | |
|---|---|---|
| 10,867,172 B2 | 12/2020 | Fürst et al. |
| 2011/0135182 A1* | 6/2011 | Goto ...................... A61B 6/032 382/131 |
| 2017/0365047 A1* | 12/2017 | Bequé .................... G16H 30/20 |
| 2019/0205686 A1* | 7/2019 | Mayer .................... H04N 23/64 |
| 2019/0377970 A1* | 12/2019 | Huber, Jr. ......... G06V 30/18143 |
| 2021/0124919 A1* | 4/2021 | Balakrishnan ....... B42D 25/309 |

* cited by examiner

METHOD TO DETERMINE AUTHENTICITY OF SECURITY HOLOGRAM

TECHNICAL FIELD

The invention relates to authentication of an identification document, more particularly a method to determine authenticity of a security hologram based on the position of the security hologram reflected by a light source.

BACKGROUND

Identity crime involving fake identification documents is prevalent in modern society. Improvement in technology gave rise to counterfeit ID card that are hard to differentiate under the scrutiny of the human eye. Industries that require identity check are adopting identity verification systems to mitigate the issue but are swamped by various issues such as user submitted images of the identification document are poorly taken, or camera instability.

U.S. Pat. No. 9,584,729 B2 disclosed a technology utilizing a mobile device to verify data captured from a digital video. The digital video contains a plurality of images, wherein each image depicts a plurality of objects that are subjected to comparison, merging, and extraction to generate a high-resolution composite image. Verification can be made via certain features or characteristics captured with the camera, such as logo, trademark, or layout of a document. The technology installed within the mobile device provides an interface for a user to select which documentation for verification. The interface is also configured to use coloured overlay to indicate whether the document is in a desired orientation prior to data capturing.

EP 3082292 A1 disclosed a method to validate user identification for digital signing of a document. The user submits an image containing the user's identification document, wherein authentication is determined by validating optical properties of the identification document within the image. To improve accuracy of the result, two or more images are taken to ensure certain security features such as hologram are visible within the image when expose to a camera flash. Depending on the result of the comparison, the image data can be determined whether the document captured is authentic.

U.S. Ser. No. 10/867,172 B2 disclosed a method to guide a user to provide identification document for identity verification. The user is guided by an operator to display the identification document in front of a camera. In turn, the camera transmits the data to the operator for live verification. The operator looks for security features such as watermarks or structural patterns. Spotted security features will be compared to a stored, standard templates to determine authenticity of the document.

However, there are certain weak points when performing user validation as cited in the prior arts. For example, fake ID card with printed hologram allow visible sight of security features under a light source regardless of the direction of the light source.

Accordingly, it can be seen in the prior art that there is a need to provide a method to improve accuracy and consistency when determine authenticity of a security feature printed on the identification document.

SUMMARY

It is an objective of the present invention to provide a method to determine authenticity of security features on an identification document.

It is also another objective of the present invention evaluate authenticity of the security feature by its position with reference to a light source directed towards the identification document.

It is yet another objective of the present invention to perform authenticity evaluation under a real-time video feed.

It is also an objective of the present invention to reduce false positive when evaluating security features detected within the real-time video feed.

The invention relates to a method to determine authenticity of a security feature of an identification document, characterized by receiving a real-time video feed of the identification document with a light source directed at the identification document to make visible a security hologram; processing the real-time video feed into a plurality of image sequence; analysing each image from the plurality of image sequence for a glare and the security hologram, wherein the glare is a reflection of the light source from the identification document; analysing the position of the glare and the security hologram in each image from the plurality of image sequence; evaluating whether the position of the glare and the position of the security hologram is caused by the light source; and providing authenticity result of the identification document captured from the real-time video feed.

BRIEF DESCRIPTION OF THE DRAWINGS

The drawings are included to provide a further understanding of the present invention. The drawings illustrate the embodiment of the invention and together with the detailed description explains the fundamentals of the embodiment.

Figure 1:
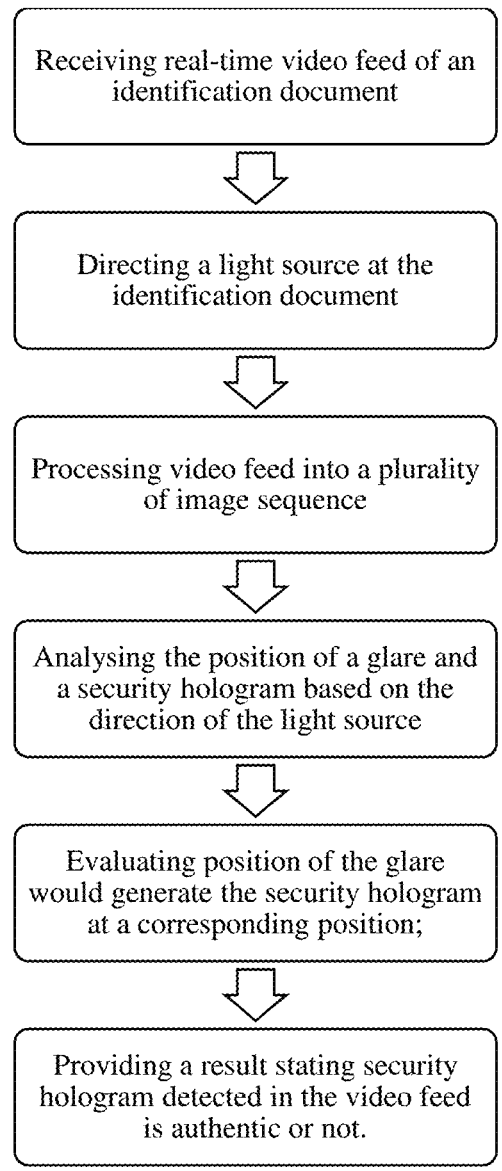
FIG. 1 depicts a method to determine authenticity of security hologram.

The drawings provided herein do not necessarily affect the scope of the embodiments. Specific embodiments have been shown by way of example in the drawings and are described in detail below. The invention, however, is not to unnecessarily limit the embodiment described. On the contrary, the embodiments are intended to cover all suitable combination, equivalents, and/or alternatives of the technology failing within the scope of this disclosure.

DETAILED DESCRIPTION OF PREFERRED EMBODIMENTS

Various examples of the mechanisms and systems introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below to avoid unnecessarily obscuring the relevant description.

The invention relates to a method to determine authenticity of a security feature of an identification document, comprising:

receiving a real-time video feed of the identification document with a light source directed at the identification document to make visible a security hologram;

processing the real-time video feed into a plurality of image sequence;

analysing each image from the plurality of image sequence for a glare and the security hologram, wherein the glare is a reflection of the light source from the identification document;

segmenting each image from the plurality of image sequence into a plurality of regions;

analysing the position of the glare and the security hologram in each image from the plurality of image sequence;

rejecting any images containing more than one glare region or hologram region;

evaluating whether the position of the glare and the position of the security hologram is caused by the light source;

providing authenticity result of the identification document captured from the real-time video feed;

using an algorithm to generate a random designated region for the light source to be directed at the identification document to make visible the security hologram; and prompting a user to ensure the light source is within the designated region, wherein the user can either reposition the identification document or the light source.

In a preferred embodiment of the present invention, the method to determine authenticity further comprising:

segmenting each image from the plurality of image sequence into a plurality of regions; and detecting position of the glare and the security hologram with reference to the plurality of regions.

In one embodiment of the present invention, any images containing more than one glare region is rejected for identification document authenticity evaluation.

In one embodiment of the present invention, any images containing more than one security hologram region is rejected for identification document authenticity evaluation.

In one embodiment of the present invention, the user has to perform the action of positioning the light source at least twice.

In an embodiment of the present invention, the method to determine authenticity further comprising:

notifying the user a time limit to ensure the light source is within the designated region;

wherein failure to position the light source within the designated region would activate the algorithm to generate another random designated region for the user to position the light source.

In an embodiment of the present invention, any device capable of transmitting real-time video feed is used to capture identification document for security hologram verification.

In one embodiment of the present invention, a mobile phone is used to transmit real-time video feed for security hologram verification.

In one embodiment of the present invention, the algorithm is performed by a mobile SDK installed within the mobile phone.

In another embodiment of the present invention, the algorithm is performed by web API.

In yet another embodiment of the present invention, any device capable of accessing the web API is selected to perform the algorithm.

The following description describes the invention in detail with reference to non-limiting embodiments.

With reference to FIG. 1, a method to authenticate a security feature of an identification document is shown, wherein the security feature is a security hologram of the identification document. The authentication process begins upon receiving a receiving a real-time video feed of the identification document with a light source directed at the identification document to make visible a security hologram. A preferred embodiment of capturing and transmitting the real-time video feed is a mobile device, whereas the light source is the mobile phone camera flash.

Figure 2:
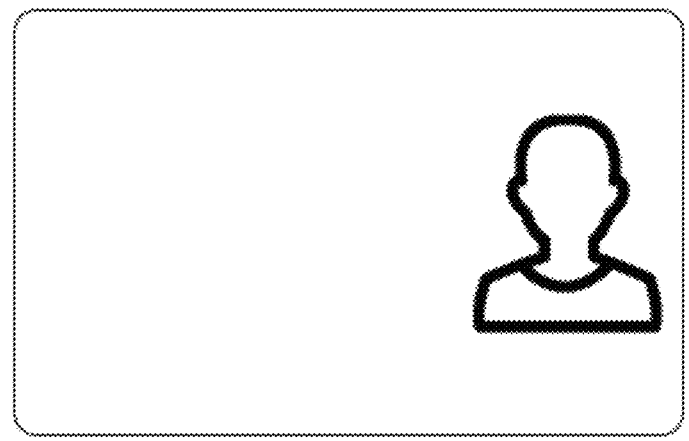
FIG. 2 depicts a schematic drawing of an identification card with a photograph of a user.

A user provides the identification document as shown in FIG. 2 for security hologram authentication. The authentication method can be applied to any identification document with security hologram printed as a security feature, such as an identity card, a driver license, or passport. In this example, an identity card with the user photograph printed on the identity card is used.

The real-time video feed would be processed into a plurality of image sequence to maximize consistency in detecting and authenticating security hologram. Each image from the plurality of image sequence would be analyse for a glare and a security hologram. In one embodiment, should any image detected to contain more than one security hologram, the image is considered a deviation and not used in further authentication steps.

The glare is a reflection of the light source reflected from the identification document. The position of the glare corresponds to the angle and direction of the light source directed at the identification document. The changes in the position and angle of the light source can be caused by moving the light source, tilting the identification card, or moving the position of the identification card. In response, the security hologram is made visible due to the light source. Furthermore, the security hologram position is unique as it is dependent on the light source.

Next, the position of the glare and the security hologram in each image is analysed and evaluated whether the position of the security hologram is expected matches designated position of the light source. Each image is evaluated against a database containing templates of authentic images containing one glare and one security hologram for each designated identification document. In a separate embodiment, each identification document has a separate corresponding database for storing authentic images of security hologram for evaluation purposes. The security hologram is considered authentic when a plurality of images from the real time video feed has a certain amount of correct matches exceeding a given threshold. Lastly, the identification document is considered authentic if the legitimacy of the security hologram is validated. The result is provided to the user via the real-time video feed.

The method disclosed in FIG. 1 may be executed step by step via an algorithm installed within a mobile software developments kit (mobile SDK) or a web application program interface (web API). However, the preferred embodiment is a mobile SDK containing the algorithm to execute the method described in FIG. 1. Although installing a mobile SDK can consume disc space within a mobile phone, the mobile SDK provides useability regardless of internet connectivity. Web API removes the need for disc space within the mobile device. However, a stable yet reliable internet connection is necessary for real-time processing of the image sequence especially when uploading a video with a significant file size.

Figure 3:
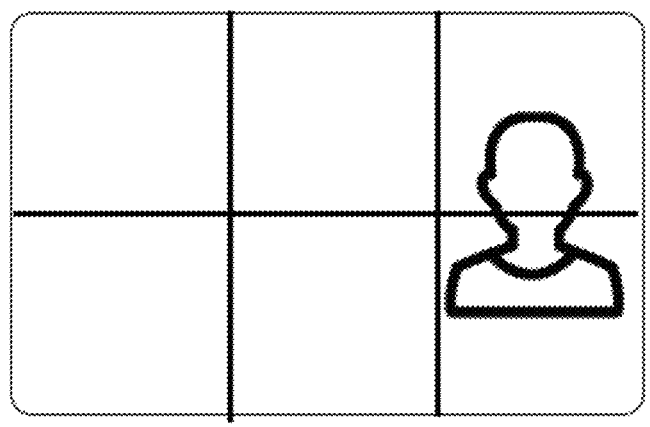
FIG. 3 depicts a schematic drawing for the identification card split into 6 regions.
Figure 4:
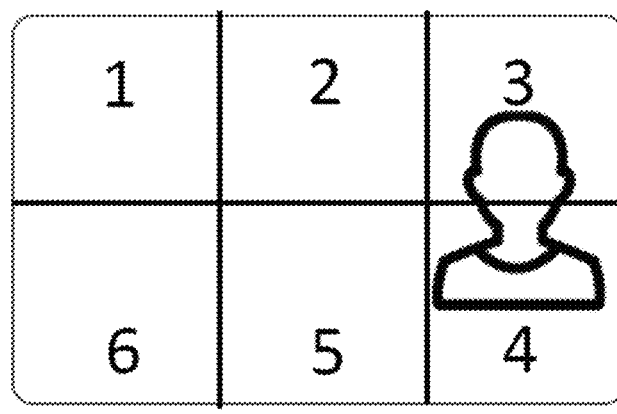
FIG. 4 depicts a schematic drawing for the identification card with numbering for each split region.

The mobile SDK can be utilized to create an interface for the user to guide the user to position the identity card in a desired position to ensure the quality and clarity of the image taken. In this example, the algorithm segmented the identity card into 6 regions for analysis as shown in FIG. 3. In some embodiment, each region is numbered for easier referencing as shown in FIG. 4.

With each image from the plurality of image sequence segmented into a plurality of regions, the algorithm checks each region, detects whether the glare and the security hologram exist, and determine the position of the glare and the security hologram with reference to the region segmented by the algorithm.

In a preferred embodiment of the invention, the algorithm generates a designated region for the light source to be positioned by random. The user would be notified of the designated region in the interface and perform the necessary adjustments. The randomized region for direction of light source is designed to prevent fraud as well as preventing false positive through trial-and-error method.

The user is prompted to perform the changes in direction of the light source at least twice, wherein each time the algorithm provides a different designated region at random.

Figure 5:
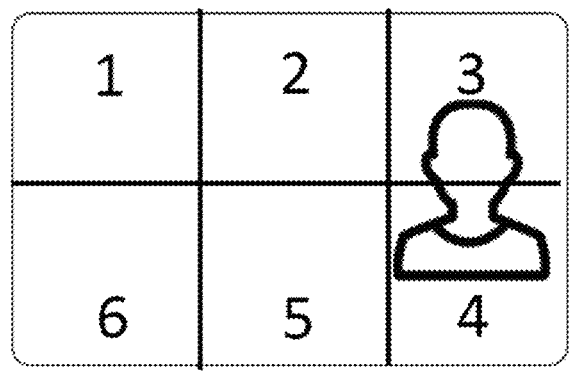
FIG. 5 depicts a schematic drawing for the identification card with instruction to direct a light source at region N.
Figure 6:
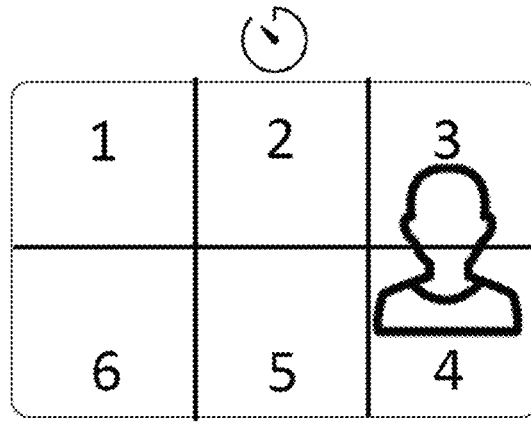
FIG. 6 depicts a schematic drawing for the identification card with a timer to prompt action from a user.

In yet another example of the present invention, there is a time limit for the user to direct the light source to designated region. This step is designed to detect fraudulent identity documents with static holograms and prevent identity fraud. For example, the user is notified to direct the light source at region X as shown in FIG. 5. In addition, a time limit will be displayed on the interface of the mobile SDK as shown in FIG. 6. If the user fails to complete the task within the given time limit, the algorithm resets the timer and generates yet another designated region for the user to direct the light source to the identification document.

Figure 7:
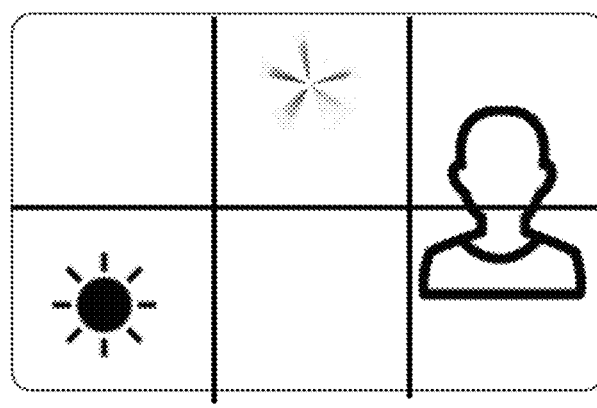
FIG. 7 depicts a schematic drawing of the identification card with a glare in upper split regions of the identification card and a security hologram in the lower regions of the identification card.
Figure 8:
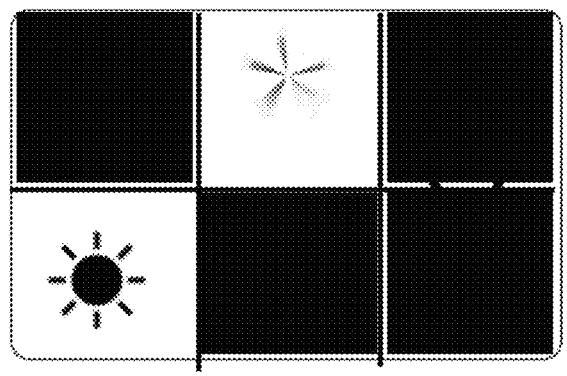
FIG. 8 depicts a schematic drawing of an algorithm validating the position of the glare, the number of the security hologram, and the position of the security hologram within the identification card.

A preferred image for evaluating authenticity of the security hologram is shown in FIG. 7. The position of the glare indicates the position and direction of the light source. Simultaneously, the position of the security hologram can be determined as the security hologram would be made visible under the light source. The algorithm determines whether there are any other security holograms visible in the image. Only images with one security hologram visible as shown in FIG. 8 would be accepted for evaluation. This step also prevents images containing static hologram from being evaluated as authentic security hologram.

The security hologram authentication method can be used to verify any identification document with security hologram imprinted on the identification document. For example, a Malaysian identity card, a Malaysian driving license, a Malaysian Passport, a Vietnamese ID card, a Vietnamese passport, and the like. In one example, the security hologram authentication method was tested with a Malaysian identity card. A video feed containing the Malaysian identity card was provided to the mobile SDK. The algorithm installed within the mobile SDK segmented the image of the Malaysia identity card into 6 regions as per FIG. 4. Next, the algorithm performs the steps disclosed in FIG. 1. It was determined that the glare will always be positioned vertically against the position of the security hologram. Therefore, any images containing the glare and security hologram positioned horizontally would be determined as fraudulent identification document.

In some embodiment, the method to determine authenticity of the security feature of the identification document, comprising using the algorithm to generate a random designated region for the light source to be directed at the identification document;

prompting the user to ensure the light source is within the designated region, wherein the user can either reposition the identification document or the light source;

receiving real-time video feed of the identification document with the security hologram made visible;

processing the real-time video feed into a plurality of image sequence;

analysing each image from the plurality of image sequence to detect any glare and the security hologram, wherein the glare is a reflection of the light source from the identification document;

segmenting each image from the plurality of image sequence into the plurality of regions;

analysing the position of the glare and the security hologram in each image from the plurality of image sequence;

rejecting any images containing more than one glare region or security hologram region;

evaluating whether the position of the glare and the security hologram is caused by the light source; and providing authenticity result of the identification document captured from the real-time video feed.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms.

The use of examples anywhere in this specification, including examples of any term discussed herein, is illustrative only and is not intended to further limit the scope and meaning of the disclosure or of any exemplified term.

Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A method to determine authenticity of a security feature of an identification document, comprising:
   receiving a real-time video feed of the identification document with a light source directed at the identification document to make visible a security hologram;
   processing the real-time video feed into a plurality of image sequence;
   analysing each image from the plurality of image sequence for a glare and the security hologram, wherein the glare is a reflection of the light source from the identification document;
   analysing the position of the glare and the security hologram in each image from the plurality of image sequence;
   evaluating whether the position of the glare and the position of the security hologram is caused by the light source;
   providing authenticity result of the identification document captured from the real-time video feed;
   using an algorithm to generate a random designated region for the light source to be directed at the identification document to make visible the security hologram; and
   prompting a user to ensure the light source is within the designated region, wherein the user can either reposition the identification document or the light source.

2. The method to determine authenticity of the security hologram according to claim 1, further comprising:
   segmenting each image from the plurality of image sequence into a plurality of regions; and
   detecting position of the glare and the security hologram with reference to the plurality of regions.

3. The method to determine authenticity of the security hologram according to claim 1, further comprising rejecting any images containing more than one glare region or hologram region for identification document authenticity evaluation.

4. The method to determine authenticity of the security hologram according to claim 1, wherein the user has to perform an action of positioning the light source at least twice.

5. The method to determine authenticity of the security hologram according to claim 1, wherein further step comprising:
   notifying the user a time limit to ensure the light source is within the designated region; wherein failure to position the light source within the designated region would activate the algorithm to generate another random designated region for the user to position the light source.

* * * * *